UNITED STATES PATENT OFFICE.

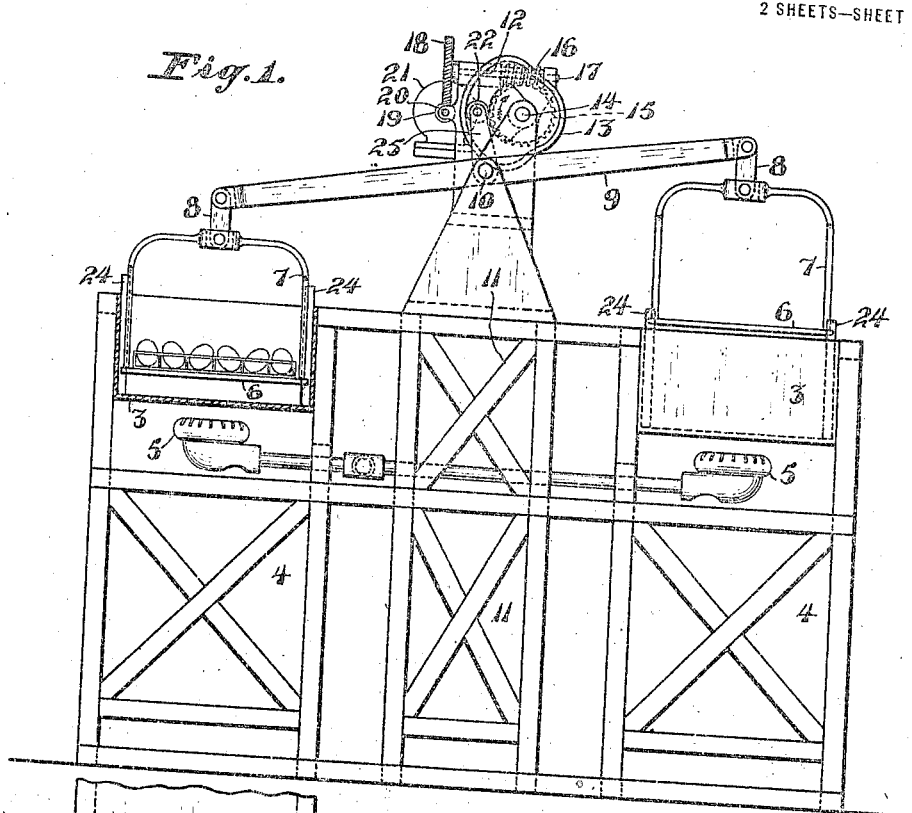
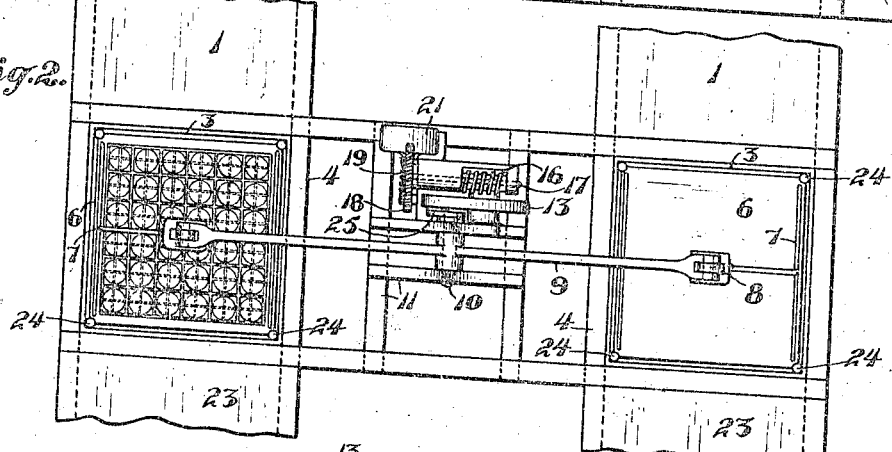
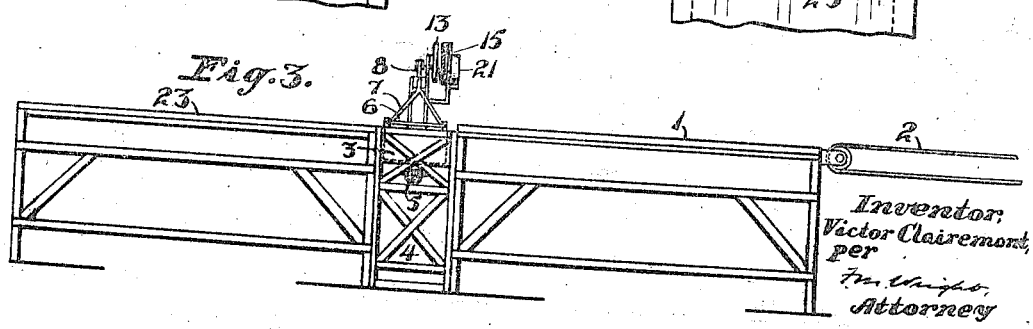

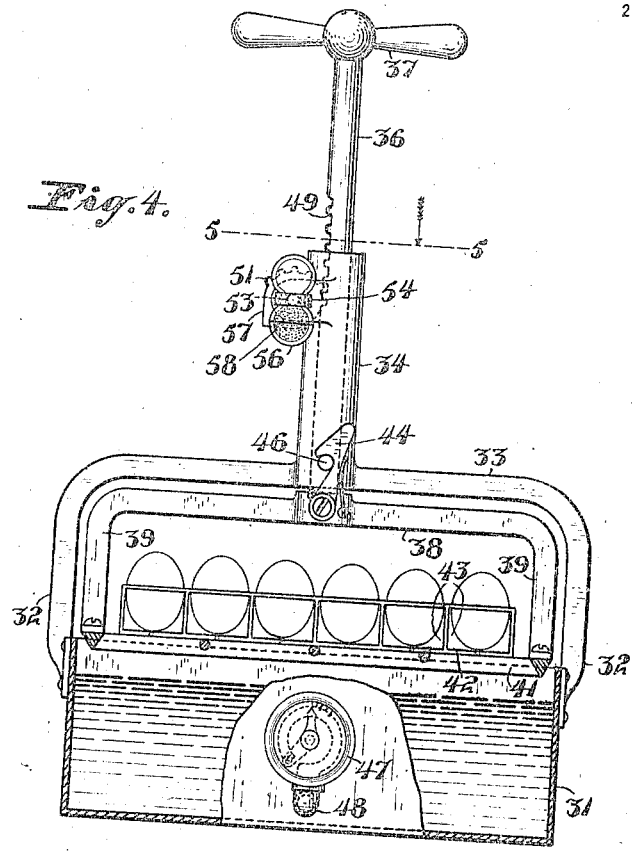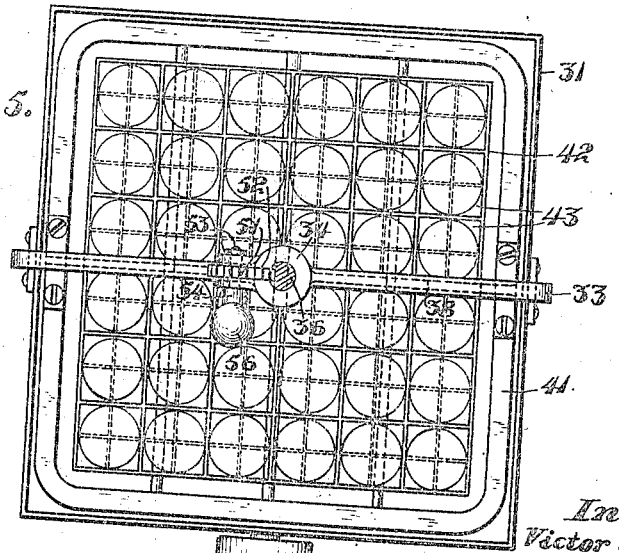

VICTOR CLAIREMONT, OF SAN FRANCISCO, CALIFORNIA.

APPARATUS FOR PRESERVING EGGS.

1,224,711.   Specification of Letters Patent.   Patented May 1, 1917.

Application filed August 9, 1916.   Serial No. 113,949.

*To all whom it may concern:*

Be it known that I, VICTOR CLAIREMONT, a citizen of the United States, residing at San Francisco, in the county of San Francisco and State of California, have invented new and useful Improvements in Apparatus for Preserving Eggs, of which the following is a specification.

The object of the present invention is to provide a simple apparatus for preserving eggs.

In the process for preserving eggs for which United States Letters Patent, No. 1,092,897, were granted to me April 14th, 1914, it was believed to be necessary to first immerse the eggs in solution heated to a comparatively low temperature (approximately 100° F.) for a brief period of time to temper the shell before immersing it in an extremely hot solution of about 250° F. Otherwise it was believed that the shell, when immersed in the very hot solution, would be cracked.

It is also found that by said patented process, a certain proportion of the eggs are spotted. This spotting is due to moisture between the skin and shell of the egg, which upon the first immersion becomes sealed therein, and is unable to escape therefrom. The proportion of eggs so spotted increases with the amount of moisture, and is greater in damp weather and less in dry weather.

Now, in seeking to discover a process by which this spotting can be prevented, I have found that it is not necessary to first dip the eggs in a warm solution, provided that the period of time during which they are dipped in the hot solution is comparatively short.

I have found that if they are dipped in a solution above the boiling point of water for about six seconds only, (from three seconds for very fresh eggs to ten seconds for eggs which are a week old I have found to give satisfactory results), then the effect of the immersion for this brief period of time is to drive out the moisture from between the skin and the shell of the egg before the shell is sealed, and I have also found that the sealing is actually completed by the time that substantially the whole of the moisture has been driven out. On account of the solution being at a temperature above the boiling point of water, the water which is driven out of the egg is immediately evaporated and rises to the top of the solution and escapes.

In the accompanying drawing, Figure 1 is a transverse sectional view of an apparatus for carrying out my improved process; Fig. 2 is a broken plan view; Fig. 3 is a side view on a reduced scale; Fig. 4 is a broken front view of a smaller apparatus for hen keepers' use; Fig. 5 is a section on the line 5—5 of Fig. 4.

Referring to the drawing, 1 indicates feed tables on to which trays of eggs are conveyed in succession by conveyers 2 from a candling room. Adjacent to the front end of each feed table is a dipping tank 3, supported by a frame 4, and in which a preservative solution is, by burners 5 beneath the tank, maintained heated to a temperature above the boiling point of water. Into said tanks can dip plates 6 guided by vertical rods 24 fixed in the tank and suspended from rods 7, each connected to a link 8, the upper ends of the links being connected to opposite ends of a lever 9 pivoted on a shaft 10 mounted in a frame 11 located between the frames 4. Said lever carries an arm 25 on which is a roller 22 which is engaged by a cam groove 12 in a cam 13 on a shaft 14 on which is also a worm wheel 15 driven by a worm 16 on a shaft 17 of a second worm wheel 18 driven by a worm 19 on a shaft 20 of a motor 21 supported by the frame 11.

The cam has two circular dwells opposite to one another subtending equal angles at the center of the cam but different distances from its shaft. The effect of the rotation of the cam is therefore to cause each plate 6 in turn to be immersed in the corresponding tank 3 for a certain period of time, while the other plate is raised above the tank for the same period. The average time of immersion required is, as I have indicated above, about six seconds, during which time the eggs in the immersed tray are sealed. This gives sufficient time to the attendant, who stands between the two feed tables, to push the tray which has just been raised out of the other tank on to a delivery table 23, at the same time pushing before him other trays in the direction of the packer who packs them in a case, and to place on said plate another tray from the adjacent feed table 1.

The apparatus shown in Figs. 4 and 5 is especially adapted for the use of farmers or poultry men, as being comparatively cheap and simple, although not of so great a capacity as the apparatus first described. 31 indicates a tank, two opposite sides of which are secured to the lower ends of arms 32 of a yoke 33, from the central portion of which extends upwardly a bearing 34 in which can reciprocate a rod 36 having at the top a handle 37. The bottom of said rod is secured to the center of a yoke 38, the lower ends of the arms 39 of which are secured to a skeleton frame 41. Said frame is adapted to support a wire basket 42 having compartments 43 for containing three dozen eggs. Said frame is held in an upper position above the top of the tank, by means of a spring-actuated latch 44 pivoted upon the center of the yoke 38 and adapted to engage a pin 46 extending from the bearing 34.

The tank containing the preservative solution may be heated by placing it upon a stove, or over an oil, gas, or other burner, and the temperature of the solution is observed by means of a thermostat 47, a conventional form thereof being shown as secured upon the front side of the tank, its casing communicating with the interior of the tank by a short pipe 48. When the temperature of the solution in the tank has reached the required degree, as indicated by said thermostat, the spring-actuated latch 44 is withdrawn from the pin 46, and the frame 41, and the basket of eggs supported thereon, are allowed to descend into the tank.

As they descend, a rack 49 formed on the side of the rod 36 engages a segment gear 51 moving in a slot 52 in the bearing 34, and secured to a shaft 53 mounted in bearings extending from the bearing 34. Said shaft 53 carries at its front end a collar 54 which encircles the middle portion of the sand glass 56. The length of the rack and gear are such that the sand glass makes one-half of a complete turn while the rod descends, and then a straight face 57 on the segment gear 51 engages the side of the rod above the rack, and the segment gear and sand glass are held in fixed position. The sand runs out from the top member of the sand glass into its bottom member, and the amount of sand and the size of the opening between the two members are such that the sand completely runs out in about ten seconds, which is the maximum limit during which the eggs should be immersed in the preservative solution. A horizontal mark 58 across the lower member, into which the sand is falling indicates, by the sand reaching the level of said mark, the time when strictly fresh eggs should be removed from the tank.

When this time arrives, the attendant lifts the handle 37 and raises the eggs out of the tank, the spring-actuated latch 44 automatically engaging the pin 46, and then removes the basket of eggs from the frame 41 preparatory to transferring them to the card board container for packing in a case of eggs.

The great utility of an apparatus of this simple character will be seen from the fact that there is estimated to be a waste of fifty million dollars annually through eggs becoming stale or unfit for use, principally due to the fact that the farmer or poultry keeper has no convenient and effective means for preserving eggs. It is impossible to ship eggs every day from farms in some localities, and in many cases it is not convenient to do so even once a week, but, with this apparatus, the eggs can be easily sterilized the same day that they are laid, and will keep fresh for an indefinite period. It is a very easy matter for the farmer, his wife or child, after the daily collection of eggs, to coat the same with the preservative solution and to assemble them on successive days to make one or more cases of eggs, and then ship said cases at his leisure to the warehouse or egg dealer.

I claim:—

1. In means for preserving eggs, a tank for containing a preservative solution, a flat frame open on at least one side and adapted to loosely support a basket of eggs, means for guiding said frame when being lowered into, and raised out of, said tank, and means for controlling said guiding movement of said frame.

2. In combination with an open-topped tank, vertical guide rods therein, a plate guided vertically by said guide rods, a lever from the free end of which said plate is suspended, means for vertically oscillating said lever, a feed table on one side of the tank and lever approximately on a level with the plate in its uppermost position, and a delivery table on the opposite side approximately at the same level.

3. The combination of a suitably pivoted lever having equal oppositely extending arms, a vertically oscillating plate suspended from the free end of each arm, a tank into which said plate can descend, tables on opposite sides of each tank and arm, and approximately at the level of the uppermost position of the plate oscillating therein, and means for oscillating said lever.

4. The combination of a suitably pivoted lever having equal oppositely extending arms, a vertically oscillating plate suspended from the free end of each arm, a tank into which said plate can descend, tables on opposite sides of each tank and arm, and approximately at the level of the uppermost position of the plate oscillating therein, and a cam for oscillating said lever and formed to cause each plate to assume positions of rest during equal intervals within and without the tank.

VICTOR CLAIREMONT.